United States Patent
Otsuka

(10) Patent No.: US 12,196,663 B2
(45) Date of Patent: *Jan. 14, 2025

(54) MICROPARTICLE SORTING DEVICE, MICROPARTICLE SORTING SYSTEM, DROPLET SORTING DEVICE, DROPLET CONTROL DEVICE, AND DROPLET CONTROL PROGRAM

(71) Applicant: Sony Group Corporation, Tokyo (JP)

(72) Inventor: Fumitaka Otsuka, Kanagawa (JP)

(73) Assignee: Sony Group Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/393,982

(22) Filed: Dec. 22, 2023

(65) Prior Publication Data

US 2024/0151630 A1  May 9, 2024

Related U.S. Application Data

(63) Continuation of application No. 17/421,697, filed as application No. PCT/JP2019/047572 on Dec. 5, 2019, now Pat. No. 11,885,730.

(30) Foreign Application Priority Data

Jan. 15, 2019 (JP) .................. 2019-004770

(51) Int. Cl.
*G01N 15/1404* (2024.01)
*G01N 15/1429* (2024.01)
*G01N 15/149* (2024.01)

(52) U.S. Cl.
CPC ..... *G01N 15/1404* (2013.01); *G01N 15/1429* (2013.01); *G01N 2015/142* (2013.01); *G01N 15/149* (2024.01)

(58) Field of Classification Search
CPC .......... G01N 15/1404; G01N 15/1429; G01N 2015/142; G01N 2015/149
See application file for complete search history.

(56) References Cited

U.S. PATENT DOCUMENTS

| 8,975,595 B2 | 3/2015 | Norton et al. |
| 10,386,287 B2 | 8/2019 | Otsuka et al. |

(Continued)

FOREIGN PATENT DOCUMENTS

| JP | 2004-117363 A | 4/2004 |
| JP | 2007-532874 A | 11/2007 |

(Continued)

OTHER PUBLICATIONS

International Search Report and English translation thereof mailed Feb. 4, 2020 in connection with International Application No. PCT/JP2019/047572.

(Continued)

*Primary Examiner* — Michael McCullough
*Assistant Examiner* — Jessica L Burkman
(74) *Attorney, Agent, or Firm* — Wolf, Greenfield & Sacks, P.C.

(57) ABSTRACT

To provide a droplet forming technology capable of stably sorting a droplet.

Provided is a microparticle sorting device provided with a voltage supply unit that supplies a drive voltage to a vibration element that applies a vibration to an orifice that generates a fluid stream, a control unit that controls a driving condition supplied to the vibration element on the basis of a relative relationship between a droplet discharged from the orifice and a satellite droplet present between droplets, and a sorting unit that sorts the droplet containing microparticles on the basis of optical information detected from the microparticles flowing through a flow path.

11 Claims, 7 Drawing Sheets

(56) References Cited

U.S. PATENT DOCUMENTS

| | | |
|---|---|---|
| 11,885,730 B2 * | 1/2024 | Otsuka ............... G01N 15/1429 |
| 2004/0062685 A1 | 4/2004 | Norton et al. |
| 2005/0227362 A1 | 10/2005 | Lary et al. |
| 2007/0148043 A1 | 6/2007 | Norton et al. |
| 2014/0212917 A1 | 7/2014 | Durack |
| 2015/0068957 A1 | 3/2015 | Otsuka et al. |
| 2017/0241889 A1 | 8/2017 | Otsuka et al. |
| 2018/0313740 A1 | 11/2018 | Otsuka |
| 2022/0091015 A1 | 3/2022 | Otsuka |

FOREIGN PATENT DOCUMENTS

| | | |
|---|---|---|
| JP | 2010-190680 A | 9/2010 |
| JP | WO 2013/145905 A1 | 12/2015 |
| JP | 2016-057286 A | 4/2016 |
| JP | WO 2017/068822 A1 | 8/2018 |
| WO | WO 2013/145905 A1 | 10/2013 |
| WO | WO-2014115409 A1 | 7/2014 |
| WO | WO 2017/068822 A1 | 4/2017 |

OTHER PUBLICATIONS

Extended European Search Report issued Feb. 1, 2022 in connection with European Application No. 19909731.2.
Written Opinion and English translation thereof mailed Feb. 4, 2020 in connection with International Application No. PCT/JP2019/047572.
International Preliminary Report on Patentability and English translation thereof mailed Jul. 29, 2021 in connection with International Application No. PCT/JP2019/047572.
U.S. Appl. No. 17/421,697, filed Jul. 8, 2021, Otsuka.

\* cited by examiner

MICROPARTICLE SORTING DEVICE, MICROPARTICLE SORTING SYSTEM, DROPLET SORTING DEVICE, DROPLET CONTROL DEVICE, AND DROPLET CONTROL PROGRAM

CROSS-REFERENCE TO RELATED APPLICATIONS

The present application claims the benefit under 35 U.S.C. § 120 as a continuation application of U.S. application Ser. No. 17/421,697, filed on Jul. 8, 2021, now U.S. Pat. No. 11,885,730, which claims the benefit under 35 U.S.C. § 371 as a U.S. National Stage Entry of International Application No. PCT/JP2019/047572, filed in the Japanese Patent Office as a Receiving Office on Dec. 5, 2019, which claims priority to Japanese Patent Application Number JP2019-004770, filed in the Japanese Patent Office on Jan. 15, 2019, each of which is hereby incorporated by reference in its entirety.

TECHNICAL FIELD

The present technology relates to a microparticle sorting device, a microparticle sorting system, a droplet sorting device, a droplet control device, and a droplet control program. More specifically, this relates to a technology of sorting and recovering a droplet containing specific particles and the like.

BACKGROUND ART

An optical measurement method using flow cytometry (flow cytometer) is conventionally used for analyzing bio-related microparticles such as cells, microorganisms, and liposomes. The flow cytometer is a device that irradiates particles flowing through a flow path formed in a flow cell, a microchip and the like with light, and detects fluorescence or scattered light emitted from each particle to analyze.

Some flow cytometers have a function of sorting to recover only particles having specific characteristics on the basis of an analysis result, and a device that especially sorts the cells is called as a "cell sorter". In the cell sorter, in general, a vibration element and the like applies a vibration to the flow cell or microchip to make fluid discharged from the flow path thereof droplets (refer to Patent Documents 1 and 2). The droplet separated from the fluid is charged with a positive (+) or negative (−) charge, then a travel direction thereof is changed by a deflection plate and the like, and the droplet is recovered in a predetermined container and the like.

In contrast, a device such as the cell sorter that sorts the droplet tends to have unstable sorting performance due to an effect and the like of temperature change, hydraulic pressure fluctuation, and differential pressure due to change in sheath pressure. Therefore, in order to stabilize the sorting performance, a microparticle sorting device that controls a drive voltage of a voltage supply unit by imaging the fluid and droplet discharged from an orifice of the flow cell or microchip and detecting the droplet from the image is conventionally proposed (refer to Patent Document 3).

Furthermore, Patent Document 4 discloses a technology of stably forming a droplet by providing, on a droplet sorting device, a detection unit that detects a state of a droplet discharged from an orifice that generates a fluid stream and a satellite droplet present between the droplets, and a control unit that controls a frequency of a drive voltage supplied to a vibration element that applies a vibration to the orifice on the basis of a position in which the satellite droplet is present.

CITATION LIST

Patent Document

Patent Document 1: Japanese Unexamined Patent Publication No. 2007-532874
Patent Document 2: Japanese Patent Application Laid-Open No. 2010-190680
Patent Document 3: International Publication No. 2013/145905
Patent Document 4: Japanese Patent Application Laid-Open No. 2016-57286

SUMMARY OF THE INVENTION

Problems to be Solved by the Invention

Although a sorting performance in a microparticle sorting technology is improved day by day by the above-described conventional technology, it is also a fact that a droplet forming technology that is less susceptible to environmental fluctuation such as temperature change and has excellent robustness is expected.

Therefore, a principal object of the present technology is to provide a droplet forming technology capable of stably sorting a droplet.

Solutions to Problems

First, the present technology provides a microparticle sorting device provided with
 a voltage supply unit that supplies a drive voltage to a vibration element that applies a vibration to an orifice that generates a fluid stream,
 a control unit that controls a driving condition supplied to the vibration element on the basis of a relative relationship between a droplet discharged from the orifice and a satellite droplet present between droplets, and
 a sorting unit that sorts the droplet containing microparticles on the basis of optical information detected from the microparticles flowing through a flow path.

In the microparticle sorting device according to the present technology, the control unit may control the driving condition using absorption easiness indicating absorption easiness of the satellite droplet by either preceding or subsequent droplet as an index.

In this case, the absorption easiness may be calculated on the basis of a positional relationship between the satellite droplet and the preceding and subsequent droplets.

Furthermore, the absorption easiness may also be calculated on the basis of a time from a break-off point of the fluid stream until the satellite droplet is absorbed by either the preceding or subsequent droplet.

Moreover, the absorption easiness may also be calculated on the basis of a distance from a break-off point of the fluid stream until the satellite droplet is absorbed by either the preceding or subsequent droplet.

In the microparticle sorting device according to the present technology, the driving condition controlled by the control unit may be a frequency of the drive voltage.

In this case, the control unit may also control strength of the drive voltage as the driving condition.

In the microparticle sorting device according to the present technology, the control unit may control the driving condition on the basis of a positional relationship between the orifice and a break-off point of the fluid stream.

Next, the present technology provides a microparticle sorting system provided with
  a microparticle sorting device provided with
    a voltage supply unit that supplies a drive voltage to a vibration element that applies a vibration to an orifice that generates a fluid stream, and
    a sorting unit that sorts a droplet containing microparticles on the basis of optical information detected from the microparticles flowing through a flow path, and
    a droplet control program that allows the microparticle sorting device to execute a control function of controlling a driving condition supplied to the vibration element that applies the vibration to the orifice on the basis of a relative relationship between the droplet discharged from the orifice that generates the fluid stream and a satellite droplet present between droplets.

Furthermore, provided is a microparticle sorting system provided with
  a microparticle sorting device provided with
    a voltage supply unit that supplies a drive voltage to a vibration element that applies a vibration to an orifice that generates a fluid stream, and
    a sorting unit that sorts a droplet containing microparticles on the basis of optical information detected from the microparticles flowing through a flow path, and
    a code of acquiring a droplet control program that allows the microparticle sorting device to execute a control function of controlling a driving condition supplied to the vibration element that applies the vibration to the orifice on the basis of a relative relationship between the droplet discharged from the orifice that generates the fluid stream and a satellite droplet present between droplets.

The present technology further provides a droplet sorting device provided with
  a voltage supply unit that supplies a drive voltage to a vibration element that applies a vibration to an orifice that generates a fluid stream, and
  a sorting unit that sorts a droplet by controlling a driving condition supplied to the vibration element on the basis of a relative relationship between the droplet discharged from the orifice and a satellite droplet present between droplets.

The present technology provides, in addition, a droplet control device provided with a control unit that controls a driving condition supplied to a vibration element that applies a vibration to an orifice on the basis of a relative relationship between a droplet discharged from the orifice that generates a fluid stream and a satellite droplet present between droplets, and a droplet control program that allows a droplet sorting device to execute a control function of controlling a driving condition supplied to a vibration element that applies a vibration to an orifice on the basis of a relative relationship between a droplet discharged from the orifice that generates a fluid stream and a satellite droplet present between droplets.

In the present technology, "microparticles" broadly include bio-related microparticles such as cells, microorganisms, and liposomes, synthetic particles such as latex particles, gel particles, and industrial particles or the like.

The bio-related microparticles include chromosomes forming various cells, liposomes, mitochondria, organelles (cell organelles) and the like. The cells include animal cells (such as blood cells) and plant cells. The microorganisms include bacteria such as Escherichia coli, viruses such as tobacco mosaic virus, fungi such as yeast and the like. Moreover, the bio-related microparticles may also include bio-related polymers such as nucleic acids, proteins, and complexes thereof.

Furthermore, the industrial particles may be, for example, an organic or inorganic polymer material, metal or the like. The organic polymer material includes polystyrene, styrene/divinylbenzene, polymethyl methacrylate and the like. The inorganic polymer material includes glass, silica, a magnetic material and the like. The metal includes gold colloid, aluminum and the like. In general, shapes of the microparticles are generally spherical, but they may be non-spherical, and its size, mass and the like are also not especially limited.

MODE FOR CARRYING OUT THE INVENTION

Figure 1:
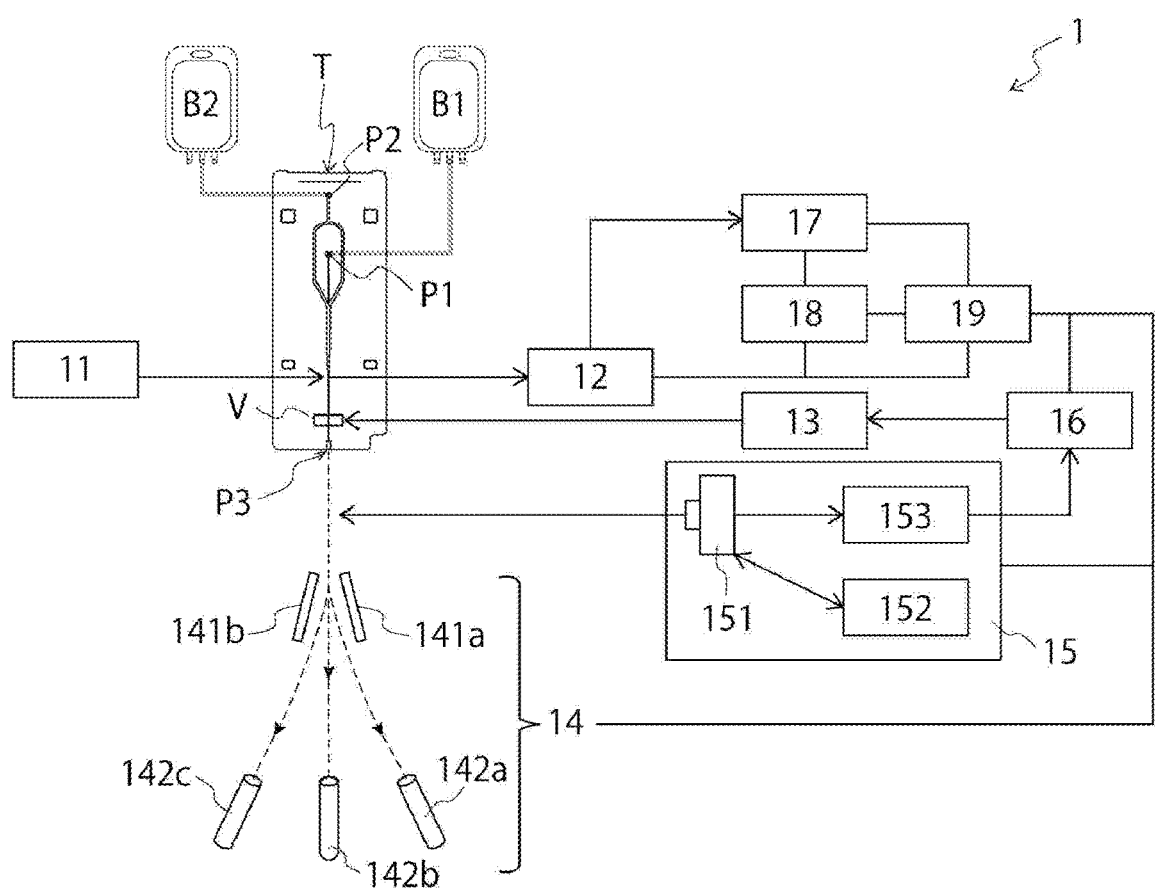
FIG. 1 is a schematic conceptual diagram schematically illustrating a microparticle sorting device 1 of a first embodiment of the present technology.

Hereinafter, a preferred mode for carrying out the present technology is described with reference to the drawings. An embodiment hereinafter described illustrates an example of a representative embodiment of the present technology, and the scope of the present technology is not narrowed by this. Note that, the description is given in the following order.
  1. Microparticle sorting device 1
    (1) Flow path P
    (2) Light irradiation unit 11
    (3) Light detection unit 12
    (4) Vibration element V
    (5) Voltage supply unit 13

(6) Sorting unit 14
(7) Droplet detection unit 15
(8) Control unit 16
(9) Analysis unit 17
(10) Storage unit 18
(11) Display unit 19
   2. Microparticle sorting system 2
   3. Droplet sorting device
   4. Droplet control device
   5. Droplet control program
<1. Microparticle Sorting Device>

A microparticle sorting device 1 according to the present technology is at least provided with a voltage supply unit 13, a control unit 16, and a sorting unit 14. Furthermore, this may also be provided with a flow path P, a light irradiation unit 11, a light detection unit 12, a vibration element V, a droplet detection unit 15, an analysis unit 17, a storage unit 18, a display unit 19 and the like as necessary. Hereinafter, each unit is described in detail in time series of sorting.

Figure 2:
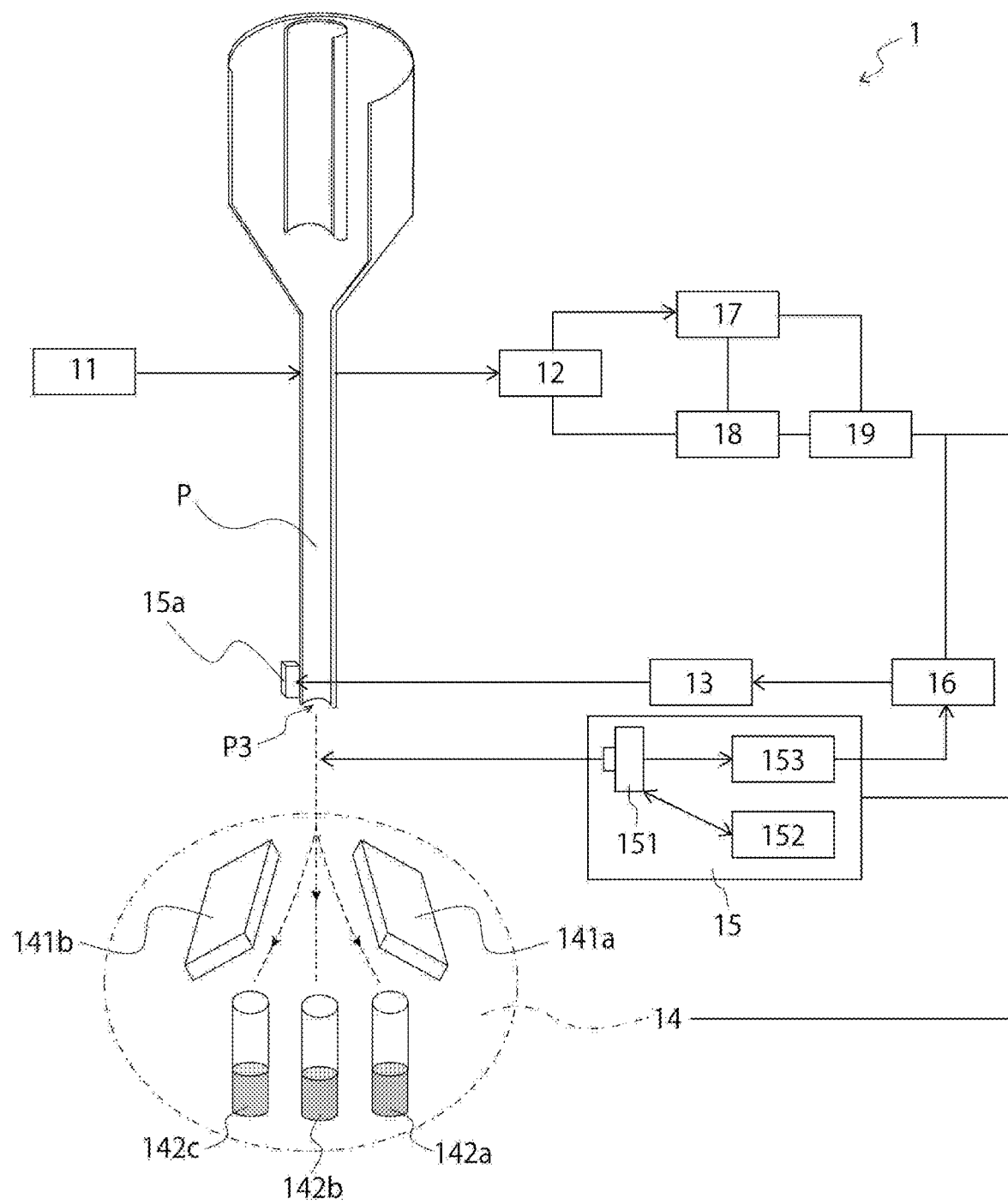
FIG. 2 is a schematic conceptual diagram schematically illustrating a microparticle sorting device 1 of a second embodiment of the present technology.

FIG. 1 is a schematic conceptual diagram schematically illustrating a first embodiment of the microparticle sorting device 1 according to the present technology, and FIG. 2 is a schematic conceptual diagram schematically illustrating a second embodiment of the microparticle sorting device 1 according to the present technology.

(1) Flow Path P

The microparticle sorting device 1 according to the present technology is the device that sorts microparticles flowing through the flow path P. Although the microparticle sorting device 1 may be provided with the flow path P in advance, it is also possible to use a commercially available flow path P, a disposable tip provided with the flow path P and the like.

A form of the flow path P is not especially limited, and may be freely designed. For example, this is not limited to the flow path P formed in a two-dimensional or three-dimensional substrate T of plastic (PP, PC, COP, PDMS and the like), glass and the like as in the first embodiment illustrated in FIG. 1, and the flow path P used in a conventional flow cytometer and the like may also be used in the microparticle sorting device 1 according to the present technology as in the second embodiment illustrated in FIG. 2.

Furthermore, a flow path width, a flow path depth, and a flow path cross-sectional shape of the flow path P are not especially limited as long as a laminar flow may be formed, and may be freely designed. For example, a micro flow path having the flow path width of 1 mm or smaller may also be used in the microparticle sorting device 1 according to the present technology. Especially, the micro flow path having the flow path width of about 10 μm or larger and 1 mm or smaller is more preferably used in the microparticle sorting device 1 according to the present technology.

A sample inlet P1 to which a liquid (sample liquid) containing the microparticles to be sorted is introduced, a sheath inlet P2 to which a sheath liquid is introduced and the like are formed on the flow path P. In the first embodiment, the sample liquid is introduced from a sample liquid storage unit B1 to the sample inlet P1, merged with the sheath liquid introduced from a sheath liquid storage unit B2 to the sheath inlet P2, and discharged from an orifice P3 provided at a terminal end of the flow path P.

Furthermore, although not illustrated, a suction outlet P4 for resolving clogging or bubbles may be formed on the flow path P. A negative pressure source such as a vacuum pump is connected to the suction outlet P4, and when the clogging or bubbles occur in the flow path P, a pressure in the flow path P may be made a negative pressure to temporarily reverse the flow, thereby resolving the clogging or bubbles.

The microparticles allowed to flow through the flow path P may be labeled with one or two or more dyes such as fluorescent dyes. In this case, the fluorescent dyes available in the present technology include, for example, Cascade Blue, Pacific Blue, fluorescein isothiocyanate (FITC), phycoerythrin (PE), propidium iodide (PI), Texas Red (TR), peridinin chlorophyll protein (PerCP), allophycocyanin (APC), 4',6-diamidino-2-phenylindole (DAPI), Cy3, Cy5, Cy7, Brilliant Violet (BV421) and the like.

(2) Light Irradiation Unit 11

The microparticle sorting device 1 according to the present technology may be provided with the light irradiation unit 11. The light irradiation unit 11 irradiates the microparticles flowing through the flow path P with light. In the microparticle sorting device 1 according to the present technology, the light irradiation unit 11 is not indispensable, and it is also possible to irradiate the microparticles flowing through the flow path P with light by using an external light irradiation device and the like.

A type of the light applied from the light irradiation unit 11 is not especially limited, but in order to surely generate fluorescence or scattered light from the microparticles, light having constant light direction, wavelength, and light intensity is desirable. There may be a laser, an LED and the like as an example. In a case of using the laser, a type thereof is not especially limited, and it is possible to freely combine one or two or more of an argon ion (Ar) laser, a helium-neon (He—Ne) laser, a dye laser, a krypton (Cr) laser, a semiconductor laser, a solid-state laser obtained by combining the semiconductor laser and a wavelength conversion optical element or the like to use.

The microparticle sorting device 1 according to the present technology may also adopt so-called multi-spot to irradiate a plurality of positions of the flow path P with light. In this case, although not illustrated, a plurality of light irradiation units 11 may be provided, and although not illustrated, it is also possible to split light from one light irradiation unit 11 via a light control unit such as a spectroscope to irradiate a plurality of positions of the flow path P with light.

(3) Light Detection Unit 12

The microparticle sorting device 1 according to the present technology may be provided with the light detection unit 12. The light detection unit 12 detects optical information emitted from the microparticles flowing through the flow path P. In the microparticle sorting device 1 according to the present technology, the light detection unit 12 is not indispensable, and it is also possible to detect the optical information emitted from the microparticles flowing through the flow path P by using an external light irradiation device and the like.

As long as the light detection unit 12 that may be used in the microparticle sorting device 1 according to the present technology may detect optical signals from the microparticles, a specific light detection method thereof is not especially limited, and it is possible to freely select to adopt the light detection method used in the well-known light detector. For example, it is possible to freely combine one or two or more of the light detection methods used in fluorescence measuring instrument, scattered light measuring instrument, transmitted light measuring instrument, reflected light measuring instrument, diffracted light measuring instrument, ultraviolet spectroscopic measuring instrument, infrared spectroscopic measuring instrument, Raman spectroscopic measuring instrument, FRET measuring instrument, FISH measuring instrument and other various spectrum measuring instruments, a PMT array or a photodiode array in which light receiving elements such as PMTs and photodiodes are one-dimensionally arranged, those in which a plurality of independent detection channels such as two-dimensional light receiving elements such as CCD or CMOS is arranged or the like to adopt.

The microparticle sorting device 1 according to the present technology may also detect light from a plurality of positions of the flow path P. In this case, although not illustrated, a plurality of light detection units 12 may be provided, and although not illustrated, one light detection unit 12 may detect light from a plurality of positions of the flow path P by controlling optical paths of the light from a plurality of positions of the flow path P via a light control unit such as a mirror.

An installation site of the light detection unit 12 in the microparticle sorting device 1 according to the present technology is not especially limited as long as the optical signals from the microparticles may be detected, and may be freely designed. For example, as in the first and second embodiments illustrated in FIGS. 1 and 2, this is preferably arranged on a side opposite to the light irradiation unit 11 across the flow path P. This is because the light irradiation unit 11 and the light detection unit 12 may be arranged in a freer configuration by arranging the light detection unit 12 on the side opposite to the light irradiation unit 11 across the flow path P. Furthermore, for example, since fluorescence is also radiated in a direction different from an incidence direction of the irradiation light, the light detection unit 12 may also be arranged on the same side as the light irradiation unit 11 or on a side at 90 degrees with reference to the flow path P.

(4) Vibration Element V

The vibration element V vibrates the flow path P at a predetermined frequency to apply a minute vibration to the sheath liquid, and form a droplet of a fluid (sample liquid and sheath liquid) discharged from the orifice P3 to generate a fluid stream (droplet flow) S. The vibration element V is not especially limited and may be freely selected to be used according to a purpose. As an example, there may be a piezo vibration element and the like.

Note that, it is sufficient that the vibration element V abuts the flow path P; for example, this may be provided as an inner configuration of the substrate T provided with the flow path P, or provided as an inner configuration of the microparticle sorting device 1.

(5) Voltage Supply Unit 13

The voltage supply unit 13 supplies a drive voltage to the vibration element V. The drive voltage of the vibration element V is supplied according to a sine wave in order to form a stable droplet, and is controlled by two parameters of frequency (clock value) and strength (drive value). A specific control method is described with the control unit 16 described later.

(6) Sorting Unit 14

The microparticle sorting device 1 according to the present technology may further be provided with the sorting unit 14 that sorts the microparticles. The sorting unit 14 sorts the microparticles on the basis of data analyzed by the analysis unit 17 to be described later from a value detected by the light detection unit 12. For example, the sorting unit 14 may sort the microparticles downstream the flow path P on the basis of an analysis result such as a size, a form, and an internal structure of the microparticles derived from analysis data.

More specifically, the droplet is generated from a discharge port of the flow path P by applying vibration to an entire flow path P or a part thereof by using the above-described vibration element V. Note that, it is possible to adjust a size of the droplet and generate the droplet containing a certain amount of microparticles by adjusting a liquid sending amount to the flow path P, a diameter of the discharge port, a vibration frequency of the vibration element and the like.

Next, although not illustrated, a charge unit charges with a positive or negative charge on the basis of the analysis result such as the size, form, and internal structure of the microparticles analyzed on the basis of the data analyzed by the analysis unit 17. The charge unit applies the positive or negative charge to the droplet discharged from the orifice P3, and includes a charging electrode, a voltage source for applying a predetermined voltage to the charging electrode and the like.

The charging electrode may be arranged in contact with the sheath liquid and/or sample liquid flowing through the flow path to apply the charge to the sheath liquid and/or sample liquid, and it is possible to provide a charging electrode inlet on the substrate T provided with the flow path P and insert the same into the charging electrode inlet, for example. Note that, the charging electrode may be arranged in contact with the sample liquid, arranged in contact with the sheath liquid, or arranged in contact with both the sample liquid and the sheath liquid. However, in consideration of an effect on cells to be sorted, it is desirable that the charging electrode be arranged in contact with the sheath liquid.

By charging a desired droplet with the positive or negative charge to charge the same in this manner, the droplet containing arbitrary microparticles may be separated by an electric force. Furthermore, by synchronizing a timing of charging by the charge unit with the supply voltage to the vibration element V, it becomes possible to charge only an arbitrary droplet.

Then, the charged droplet a pathway of which is changed in a desired direction by a polarizer plate 141 is sorted. Specifically, deflection plates 141a and 141b that change a travel direction of each droplet in the fluid stream S by an electric force acting between the same and the charge applied to the droplet to guide the same to a predetermined recovery container are arranged so as to be opposed to each other across the fluid stream S. As the deflection plates 141a and 141b, for example, generally used electrodes may be used.

Positive or negative different voltages are applied to the deflection plates 141a and 141b, and when the charged droplet passes through an electric field formed by them, an electric force (Coulomb force) is generated, and each droplet is attracted in a direction toward either the deflection plate 141a or 141b. In the microparticle sorting device 1, it is possible to control a direction of a flow of the droplets attracted by the electric field (side stream) by changing the polarity of the charge to the droplet and a charge amount, so that it becomes possible to simultaneously sort a plurality of particles different from each other.

Each droplet the pathway of which is changed in the desired direction by the polarizer plates 141a and 141b is recovered by recovery containers 142a to 142c. As the recovery containers 142a to 142c, general-purpose plastic tubes, glass tubes and the like may be used for experiments. It is preferable that these recovery containers 142a to 142c are arranged so as to be exchangeable in the device. Furthermore, a drainage passage of the recovered droplet may be connected to the recovery container that receives the particles not to be sorted out of the recovery containers 142*a* to 142*c*.

Note that, the number of recovery containers arranged in the droplet sorting device 1 is not especially limited. For example, in a case where more than three recovery containers are arranged, it is possible that each droplet is guided to any one of the recovery containers depending on the presence or absence of an electrical acting force between the same and the deflection plates 141*a* and 141*b* and magnitude thereof.

(7) Droplet Detection Unit 15

The microparticle sorting device 1 according to the present technology may be provided with the droplet detection unit 15. The droplet detection unit 15 detects a state of a droplet D discharged from the orifice P3 of the flow path P and a satellite droplet SD present between the droplets D. In the microparticle sorting device 1 according to the present technology, the droplet detection unit 15 is not indispensable, and it is also possible to detect the state of the droplet D discharged from the orifice P3 of the flow path P and the satellite droplet SD between the droplets D by using an external detection device and the like.

The droplet detection unit 15 may include an imaging element 151 that images the droplet D and the satellite droplet SD, a position adjustment mechanism 152 for making a position of the imaging element 151 follow fluctuation in break-off point BP, an image data processing unit 153 that acquires position information of the droplet D and the satellite droplet SD from an imaged image and the like. As the imaging element 151, various imaging elements such as a photoelectric conversion element may be used in addition to an imaging device such as a CCD or CMOS camera. Note that, the microparticle sorting device 1 of this embodiment may also be provided with a light source (not illustrated) that illuminates an imaging region in addition to the imaging element 151.

The image data processing unit 153 may also include an information processing device including, for example, a general-purpose processor, a main storage device, an auxiliary storage device and the like. In this case, it is possible to acquire the position information of the satellite droplet by inputting image data indicating the state of the droplet and the satellite droplet imaged by the imaging element 151 to the image data processing unit 153 and executing a programmed control algorithm. Such a computer program may be stored in a recording medium such as a magnetic disk, an optical disk, a magneto-optical disk, and a flash memory, for example, or may be distributed via a network.

(8) Control Unit 16

The control unit 16 controls a driving condition supplied to the vibration element V on the basis of a relative relationship between the droplet D discharged from the orifice P3 and the satellite droplet SD present between the droplets D. Specifically, the control unit 16 controls the frequency (clock value) and/or strength (drive value) of the drive voltage supplied to the vibration element V. The control unit 16 may include an information processing device and the like including, for example, a general-purpose processor, a main storage device, an auxiliary storage device and the like.

In that case, it is possible to automatically control the frequency (clock value) and/or strength (drive value) of the drive voltage supplied from the voltage supply unit 13 to the vibration element V by inputting the information of the droplet D and the satellite droplet SD acquired by the image data processing unit 153 of the droplet detection unit 15 to the control unit 16 and executing the programmed control algorithm. Such a computer program may be stored in a recording medium such as a magnetic disk, an optical disk, a magneto-optical disk, and a flash memory, for example, or may be distributed via a network.

Hereinafter, the control method performed by the control unit 16 is described in detail.

Generally, the following is known in droplet formation.

(1) The closer the break-off point BP is to the orifice P3, the more advantageous it is for sorting.
(2) For the sorting, a state in which the satellite droplet SD is absorbed by a preceding droplet D (fast) or a state in which this is absorbed by a subsequent droplet D (slow) is suitable.
(3) In a case where the satellite droplet SD is not absorbed by the preceding or subsequent droplet D, the side stream might become unstable.
(4) A state in which a vibration transmission characteristic is excellent and the break-off point BP changes according to a change in drive value may respond to an environmental change such as temperature change during the sorting.
(5) For the sorting, a state in which the droplet is bilaterally symmetrical is suitable.
(6) In a cell sorter with a fixed flow cell (refer to, for example, FIG. 2), a frequency satisfying (1) to (5) described above is adjusted in advance at the time of device installation, and it is not necessary to adjust the frequency again when a user uses the same. However, in a cell sorter in which the flow path may be exchanged (for example, tip exchange type illustrated in FIG. 1), the frequency satisfying (1) to (5) described above slightly differs for each flow path, so that it is desirable to adjust the frequency to determine an optimum frequency for each flow path each time the flow path is exchanged.

Therefore, the microparticle sorting device 1 according to the present technology determines the driving condition of the vibration element V for forming the droplet satisfying (1) to (5) described above, that is, the frequency (clock value) and/or strength (drive value) of the drive voltage of the vibration element V by a method such as image processing. Specifically, the microparticle sorting device 1 according to the present technology may control the driving condition by using, as an index, absorption easiness indicating absorption easiness of the satellite droplet SD by either the preceding or subsequent droplet D, for example, as the control method of the frequency (clock value) and/or strength (drive value) of the drive voltage of the vibration element V by the control unit 16. By using the absorption easiness as the index, even in a case where the position of the satellite droplet SD fluctuates due to the environmental change such as the temperature change during the sorting, the state in which the satellite droplet SD is absorbed by the preceding or subsequent droplet D may be maintained to continue stable sorting.

Note that, there are several possible methods for determining whether a target droplet is the droplet D or the satellite droplet SD, and the method is not especially limited; a method using an area value after binarization of the target droplet and a method using also a width of the target droplet may be applied, for example. In the method using the area value, for example, it is determined to be the droplet D in a case where the area value is X or larger, and it is determined to be the satellite droplet SD in a case where the area value is smaller than X. In the method using the width, for example, the largest value of the width is acquired out of a plurality of target droplets, and it is determined to be the droplet D in a case where the width is not smaller than half the same, and it is determined to be the satellite droplet SD in a case where the width is smaller than the same. Furthermore, it is also possible to determine by combining these two determination methods.

Figure 3:
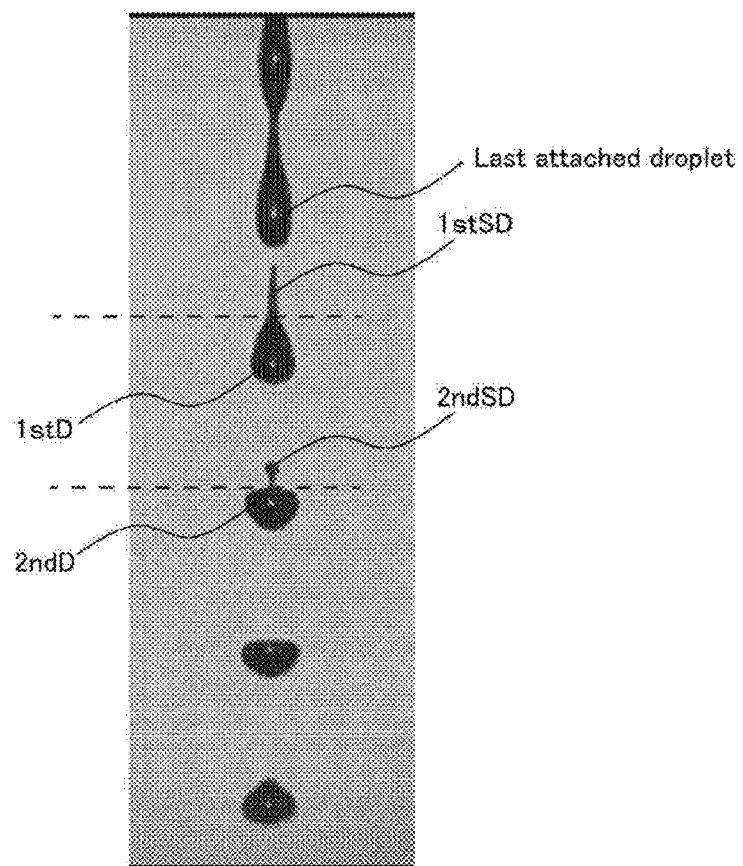
FIG. 3 is a view illustrating an example of a state of a fluid and a droplet discharged from an orifice P3.

Note that, in a case where the satellite SD is continuous to the droplet D but a satellite portion may be clearly detected as illustrated in FIG. 3, it is also possible to calculate the absorption easiness described above by detecting a constricted part (width inflection point) of the satellite portion and separating the satellite portion from the droplet D (refer to broken line in FIG. 3).

Furthermore, in contrast, it is possible to determine whether or not the satellite droplet SD is absorbed by the droplet D by whether or not the satellite droplet SD is present below the droplet D. For example, in a case where two objects are continuously determined to be the droplets D, it may be determined that the satellite droplet SD is absorbed. Note that, in order to avoid erroneous determination, the satellite absorption may be determined in a case where three objects are continuously determined to be the droplets.

In a case where it is determined that the satellite droplet SD is absorbed, it is also possible to specify whether it is in the state in which the satellite droplet SD is absorbed by the preceding droplet D (fast) or in the state in which this is absorbed by the subsequent droplet D (slow) depending on the position of the satellite droplet SD detected the last. It is also possible to limit the case where it is determined that the satellite droplet SD is absorbed to only either the fast or slow state, for example, by utilizing this. Therefore, the sorting may always be performed under a constant droplet condition.

Calculation Method Example 1 of Absorption Easiness

Figure 4:
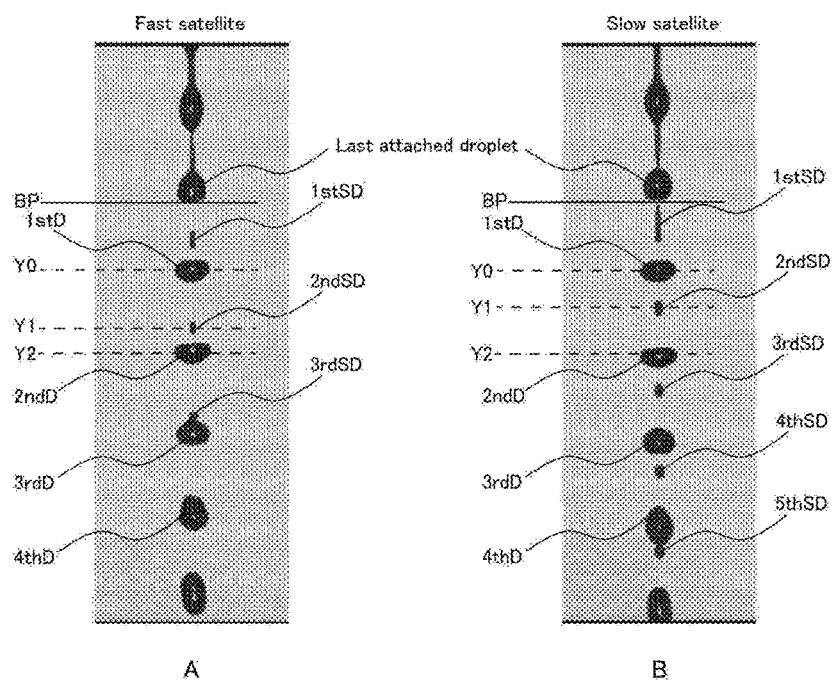
FIG. 4 is a view illustrating an example of the state of the fluid and the droplet discharged from the orifice P3, in which A illustrates a state in which a satellite droplet SD is absorbed by a preceding droplet D (fast), and B illustrates a state in which the satellite droplet SD is absorbed by a subsequent droplet D (slow).

The absorption easiness may be calculated on the basis of, for example, a positional relationship between the satellite droplet SD and the preceding and subsequent droplets D. A specific example is described with reference to FIG. 4. FIG. 4 is a view illustrating a state of the fluid and the droplet discharged from the orifice P3, in which A illustrates a state in which the satellite droplet SD is absorbed by the preceding droplet D (fast), and B illustrates a state in which the satellite droplet SD is absorbed by the subsequent droplet D (slow).

First, absorption easiness satellite absorption degree may be calculated on the basis of following calculation expression (1) or (2), for example, on the basis of a gravity center position Y1 of a specific satellite droplet SD (in the example illustrated in FIG. 4, a second satellite droplet 2ndSD is selected) and gravity center positions Y0 and Y2 of the preceding and subsequent droplets D (in the example illustrated in FIG. 4, a first droplet 1stD and a second droplet 2ndD).

[In Case of State in which Satellite Droplet SD is Absorbed by Preceding Droplet D (Fast)]

$$\text{Absorption easiness}=(Y1-Y0)/(Y2-Y0) \quad (1)$$

[In Case of State in which Satellite Droplet SD is Absorbed by Subsequent Droplet D (Slow)]

$$\text{Absorption easiness}=(Y2-Y1)/(Y2-Y0) \quad (2)$$

In this case, a case where the absorption easiness is further closer to 1 is considered to be a state in which the absorption easiness by the droplet D is high, and this may be used as the index.

The satellite droplet used for calculating the absorption easiness is considered to be a first droplet 1stD (the satellite droplet immediately subsequent to the droplet immediately preceding the break-off: last attached droplet), a second satellite droplet 2ndSD, a third satellite droplet 3rdSD (refer to FIG. 4) and the like, and by using the satellite droplet SD on a lower side, the index is more reliable for observing the absorption easiness of the satellite droplet. However, in this case, depending on an angle of view of the imaging element 151 of the droplet detection unit 15 described above, it might be necessary to move the imaging element 151, and there is a risk for an increase in adjusting time. It should determine the satellite droplet SD to be used from the angle of view of the imaging element 151, tendency of an actual absorption position of the satellite droplet SD and the like.

Figure 5:
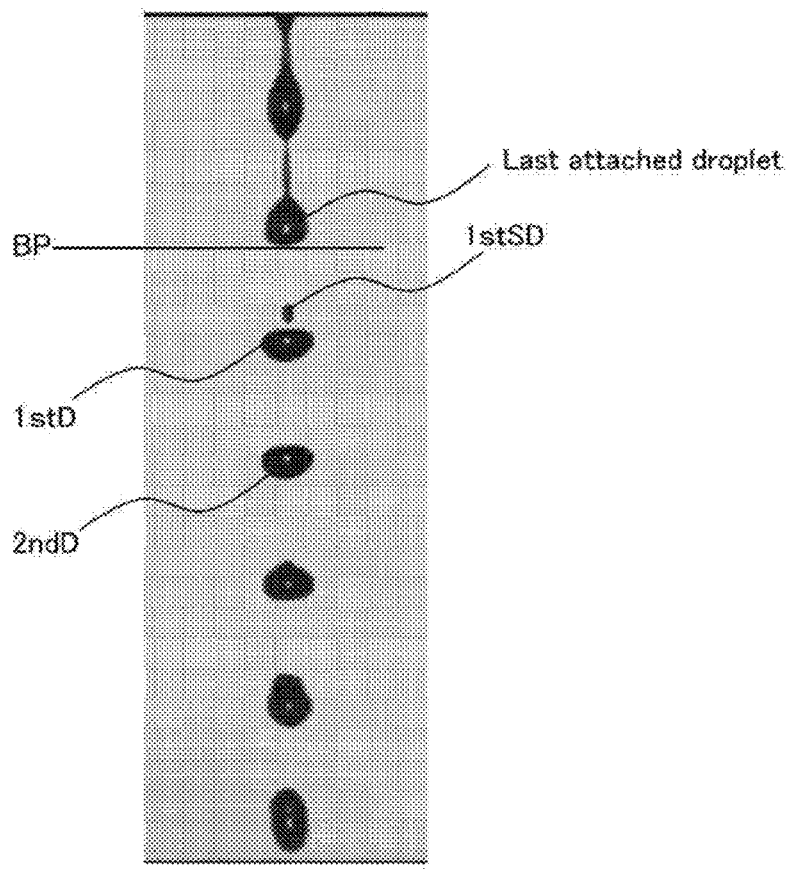
FIG. 5 is a view illustrating an example of the state of the fluid and the droplet discharged from the orifice P3.

Note that, in a case where a relevant satellite droplet SD is already absorbed by the droplet and is not present as illustrated in FIG. 5, it is possible to determine a satellite droplet absorbing direction (fast or slow) from the position of the satellite droplet SD above the same; however, since the second satellite is already absorbed, the absorption easiness is 1.

Calculation Method Example 2 of Absorption Easiness

The absorption easiness may be calculated on the basis of, for example, a time from the break-off point BP of the fluid stream until the satellite droplet SD is absorbed by either the preceding or subsequent droplet D. For example, in FIG. 4A, it is present up to the third satellite droplet 3rdSD, but a fourth satellite droplet is not present, so that it is considered that this is absorbed by a fourth droplet 4thD. The time from the break-off point BP until the satellite droplet SD is absorbed is calculated from an imaging time of the break-off point BP and an imaging time of the fourth droplet 4thD, and this may be used as the index considering that the shorter the time is, the higher the absorption easiness is.

Note that, although the time from the break-off point BP until the satellite droplet SD is absorbed is made the index in the calculation method example 2, it is also possible to simply make it the index to what number of droplet D this is absorbed. For example, in FIG. 5, since the second satellite 2ndSD is not present, it is considered that this is absorbed by the second droplet 2ndD, so that it is possible to determine that the absorption easiness is higher than that in a case in FIG. 4A in which this is considered to be absorbed by the fourth droplet 4thD.

Calculation Method Example 3 of Absorption Easiness

The absorption easiness may also be calculated on the basis of, for example, a distance from the break-off point BP of the fluid stream until the satellite droplet SD is absorbed by either the preceding or subsequent droplet D. For example, as compared with the case in FIG. 4A in which this is considered to be absorbed by the fourth droplet 4thD, the distance from the break-off point BP is shorter in FIG. 5 in which this is considered to be absorbed by the second droplet 2ndD, so that it is considered to be in a state in which the absorption easiness is higher, and this may be made the index.

Using the absorption easiness described above as the index, the optimum frequency (clock value) and/or optimum strength (drive value) is determined by repeating while changing the frequency (clock value) and/or strength (drive value) of the drive voltage. At that time, the change in frequency (clock value) of the drive voltage is not especially limited, but in a case where a diameter of the orifice P3 is 70 μm, it may be carried out within a range of 49 kHz±3 kHz in increment of 0.1 kHz, for example.

Figure 6:
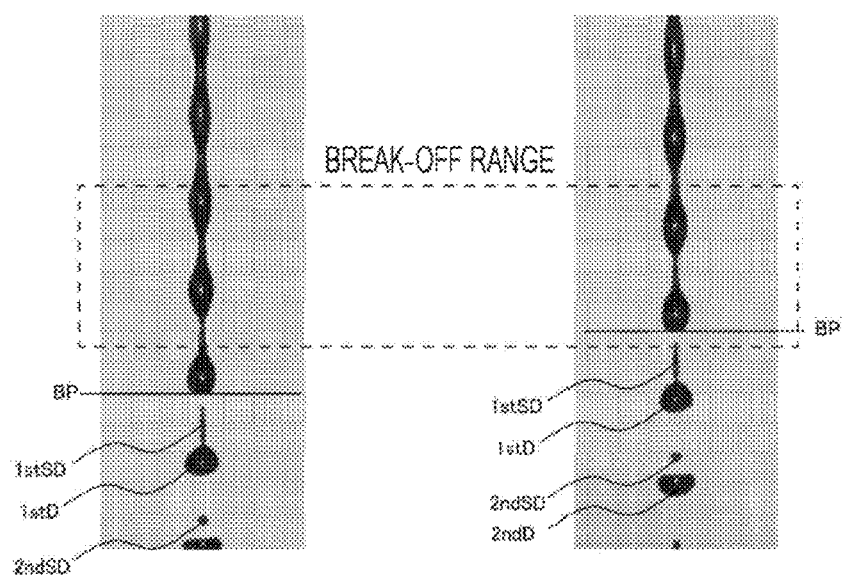
FIG. 6, left side, is a view illustrating an example of the state of the fluid and the droplet discharged from the orifice P3 before moving an imaging element 151, and FIG. 6, right side, is a view illustrating an example of the state of the fluid and the droplet discharged from the orifice P3 after lowering the imaging element 151.

Furthermore, when determining the optimum frequency (clock value) and/or strength (drive value), the positional relationship between the orifice P3 and the break-off point BP may be taken into consideration. Specifically, as illustrated in FIG. 6, a process of adjusting the position of the break-off point BP in a break-off range set in advance (refer to broken line square in FIG. 6) is repeatedly performed while changing the frequency (clock value) and/or strength (drive value).

A method thereof is not especially limited, and, for example, there is a method of adjusting the position of the break-off point BP by sequentially performing a process of moving the imaging element 151 of the above-described droplet detection unit 15 by a certain distance and checking the position of the break-off point BP by image processing. In contrast, there also is a method of acquiring a correlation value between the number of pixels of the droplet image and a sensor amount of the imaging element 151 in advance, calculating a target sensor value from a pixel distance between the break-off point BP and the break-off range, and moving the imaging element 151 so as to reach the sensor value. In this method, the number of times of movement of the imaging element 151 for position adjustment may be reduced, so that it is possible to efficiently adjust the position.

Then, the frequency (clock value) and/or strength (drive value) is ranked in descending order of the height of the break-off point BP, it is sequentially determined while using the absorption easiness of the satellite droplet SD as the index from the frequency (clock value) and/or strength (drive value) with the higher break-off point BP, and the frequency (clock value) and/or strength (drive value) with higher absorption easiness is determined as the optimum frequency (clock value) and/or strength (drive value). This makes it possible to more efficiently adjust the optimum frequency (clock value) and/or optimum strength (drive value).

In this manner, it is possible to more efficiently control the driving condition by determining the optimum frequency (clock value) and/or optimum strength (drive value) by combining the determination of the frequency (clock value) and/or strength (drive value) by the break-off point BP and determination of the frequency (clock value) and/or strength (drive value) using the absorption easiness as the index.

As described above in detail, the microparticle sorting device 1 according to the present technology may stably form the droplet D even when there is the environmental fluctuation. Therefore, in the tip exchange type cell sorter, the optimum frequency (clock value) and/or strength (drive value) may be determined for each tip, and droplet shape control of high stability and robustness may be realized.

Furthermore, the microparticle sorting device 1 according to the present technology may determine the optimum frequency (clock value) and/or strength (drive value) for forming the stable side stream and may realize stable sorting. As a result, according to the microparticle sorting device 1 according to the present technology, it becomes possible to realize highly accurate and stable sorting for a long period of time while suppressing an effect by a change in environmental temperature, reduction of sheath liquid/sample liquid, clogging and mixing of bubbles, and a change in droplet shape.

Hereinafter, a specific procedure of the control method performed by the control unit 16 of the microparticle sorting device 1 according to the present technology is described with reference to a flowchart.

[Example of Controlling Frequency (Clock Value) of Drive Voltage]

Figure 7:
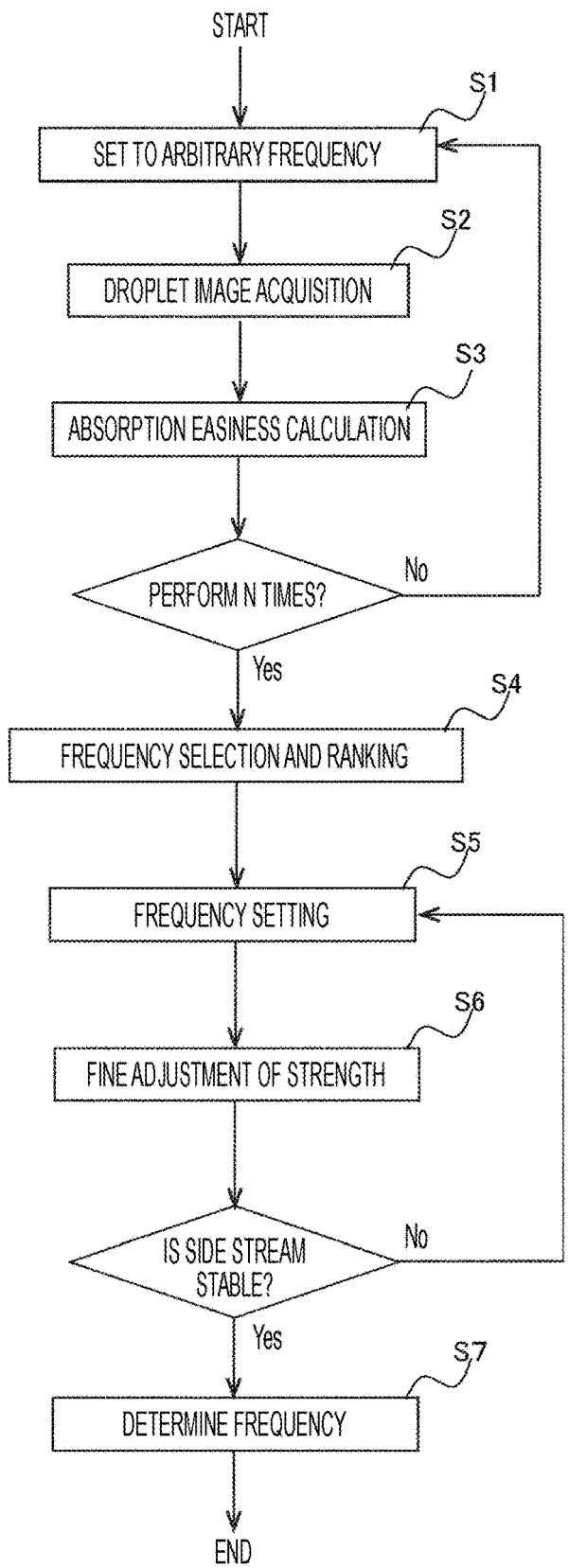
FIG. 7 is a flowchart illustrating an example of a procedure of controlling a frequency (clock value) of a drive voltage.

FIG. 7 is a flowchart illustrating an example of a procedure of controlling the frequency (clock value) of the drive voltage. First, the frequency (clock value) of the drive voltage is set to an arbitrary frequency (clock value) (step S1). Next, the control unit 16 acquires the droplet image including the break-off point BP (step S2). Then, the control unit 16 calculates the absorption easiness of the satellite droplet SD by the droplet D on the basis of the above-described calculation method of the absorption easiness (step S3).

The control unit 16 iteratively executes an iterative process corresponding to steps S1 to S3 illustrated in FIG. 7 by N times equal to the number of data to be ranked. When the iterative process is finished, the procedure shifts to step S4.

At steps S4 and S5, the control unit 16 selects and ranks the frequencies on the basis of the calculated absorption easiness, and sets the optimum frequency with the highest absorption easiness. Note that, in a case where there are the frequencies with the same absorption easiness, it is possible to appropriately set a rule; for example, in a case of the calculation method example 1, the absorption easiness for the upper satellite droplet SD is used, or a higher frequency is selected. Furthermore, since sorting efficiency is improved at a higher frequency in general, the optimum frequency may be selected by combining the absorption easiness and the frequency value.

Thereafter, in order to stabilize the side stream, the strength (drive value) of the drive voltage is finely adjusted (step S6), and in a case where it is determined that the condition is not suitable for the sorting such as when a side stream splash is observed in the course of the fine adjustment, after the procedure is returned to step S5 to select a defective frequency condition, the strength (drive value) of the drive voltage is finely adjusted again (step S6), the frequency at which the side stream is stabilized is finally determined (step S7), and the control procedure is finished.

[Example of Controlling Frequency (Clock Value) and Strength (Drive Value) of Drive Voltage]

Figure 8:
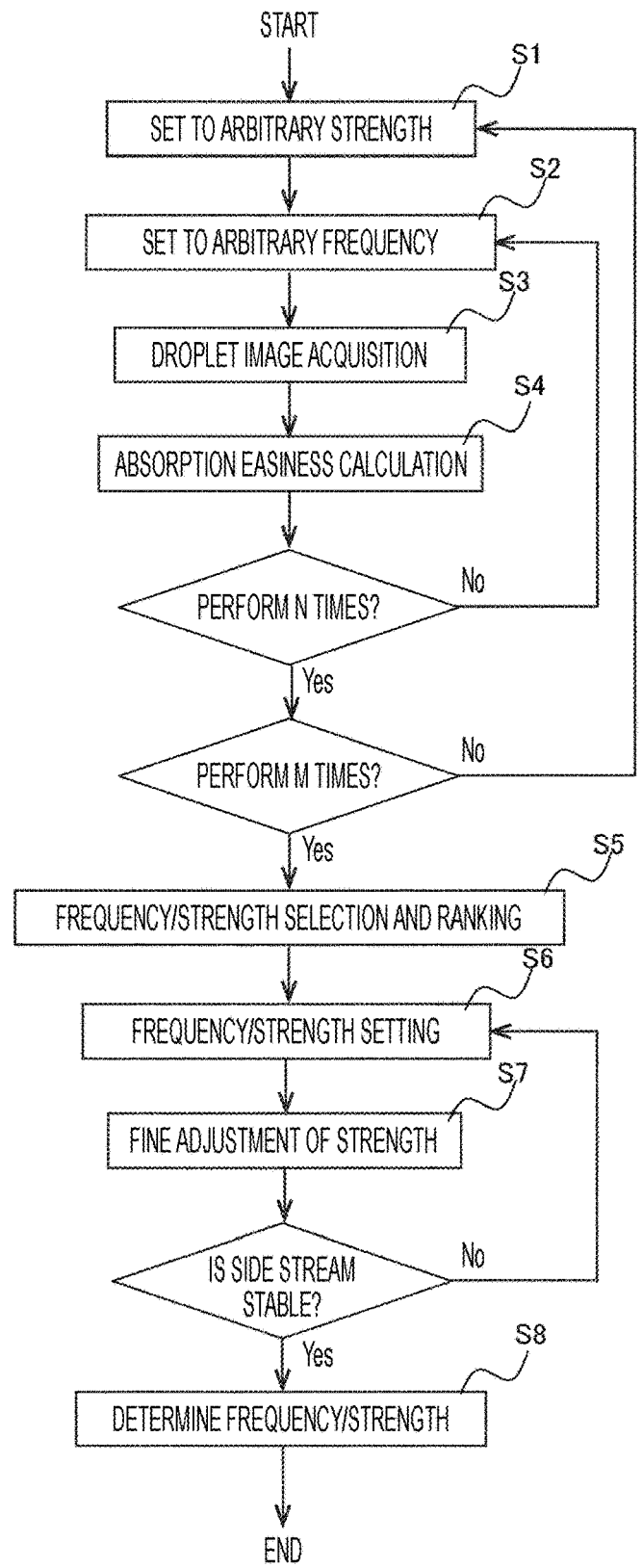
FIG. 8 is a flowchart illustrating an example of a procedure of controlling the frequency (clock value) and strength (drive value) of the drive voltage.

FIG. 8 is a flowchart illustrating an example of a procedure of controlling the frequency (clock value) and strength (drive value) of the drive voltage. First, the strength (drive value) of the drive voltage and the frequency (clock value) of the drive voltage are set to an arbitrary frequency (clock value) (steps S1 and S2). Next, the control unit 16 acquires the droplet image including the break-off point BP (step S3). Then, the control unit 16 calculates the absorption easiness of the satellite droplet SD by the droplet D on the basis of the above-described calculation method of the absorption easiness (step S4).

The control unit 16 iteratively executes an iterative process corresponding to steps S1 to S4 illustrated in FIG. 8 by N times (frequency) and M times (strength) equal to the number of data to be ranked. When the iterative process is finished, the procedure shifts to step S5.

At steps S5 and S6, the control unit 16 selects and ranks the frequencies and strengths on the basis of the calculated absorption easiness, and sets the optimum frequency and optimum strength with the highest absorption easiness. This makes it possible to simultaneously determine the optimum frequency and strength.

Note that, in a case where there are the frequencies with the same absorption easiness, it is possible to appropriately set a rule; for example, in a case of the calculation method example 1, the absorption easiness for the upper satellite droplet SD is used, or a higher frequency is selected. Furthermore, since sorting efficiency is improved at a higher frequency in general, the optimum frequency may be selected by combining the absorption easiness and the frequency value.

Furthermore, in a case where there are the strengths having the same absorption easiness, it is possible to appropriately set a rule; for example, a low vibration strength condition is given priority in order to secure a vibration strength margin.

Thereafter, in order to stabilize the side stream, the strength (drive value) of the drive voltage is finely adjusted (step S7), and in a case where it is determined that the condition is not suitable for the sorting such as when a side stream splash is observed in the course of the fine adjustment, after the procedure is returned to step S6 to select a defective frequency condition, the strength (drive value) of the drive voltage is finely adjusted again (step S7), the frequency and strength at which the side stream is stabilized are finally determined (step S8), and the control procedure is finished.

(9) Analysis Unit 17

The microparticle sorting device 1 according to the present technology may further be provided with the analysis unit 17 as necessary. The analysis unit 17 is connected to the light detection unit 12 and analyzes the optical information detected from the microparticles by the light detection unit 12.

For example, the analysis unit 17 calculates a feature amount of each microparticle from the optical information of light received from the light detection unit 12. Specifically, the feature amount indicating the size, form, internal structure and the like of the microparticles is calculated from detected values of received fluorescence and scattered light.

Note that, the analysis unit 17 is not indispensable in the microparticle sorting device 1 according to the present technology, and it is also possible to analyze the state and the like of the microparticles by using an external analysis device and the like on the basis of the optical information detected by the light detection unit 12. For example, the analysis unit 17 may be implemented by a personal computer or a CPU, and may be stored as a program in a hardware resource provided with a recording medium (for example, a non-volatile memory (USB memory), an HDD, a CD and the like) and the like and allowed to function by the personal computer or CPU. Furthermore, the analysis unit 17 may be connected to each unit of the microparticle sorting device 1 via a network.

(10) Storage Unit 18

The microparticle sorting device 1 according to the present technology may further be provided with the storage unit 18 in which various pieces of information are stored. The storage unit 18 may store any item regarding the sorting of the microparticles such as information data detected by each of the light detection units 12, information data detected by the droplet detection unit 15, control data by the control unit 16, analysis data generated by the analysis unit 17, and data of the microparticles sorted by the sorting unit 14.

In the microparticle sorting device 1 according to the present technology, the storage unit 18 is not indispensable, and an external storage device may also be connected. As the storage unit 18, for example, a hard disk and the like may be used.

(11) Display Unit 19

The microparticle sorting device 1 according to the present technology may be provided with the display unit 19 that displays various types of information. The display unit 19 may display any item regarding the sorting of the microparticles such as information data detected by each of the light detection units 12, information data detected by the droplet detection unit 15, control data by each control unit, analysis data generated by the analysis unit 17, and data of the microparticles sorted by the sorting unit 14.

In the microparticle sorting device 1 according to the present technology, the display unit 19 is not indispensable, and an external display device may also be connected. As the display unit 19, for example, a display, a printer and the like may be used.

<2. Microparticle Sorting System 2>

Figure 9:
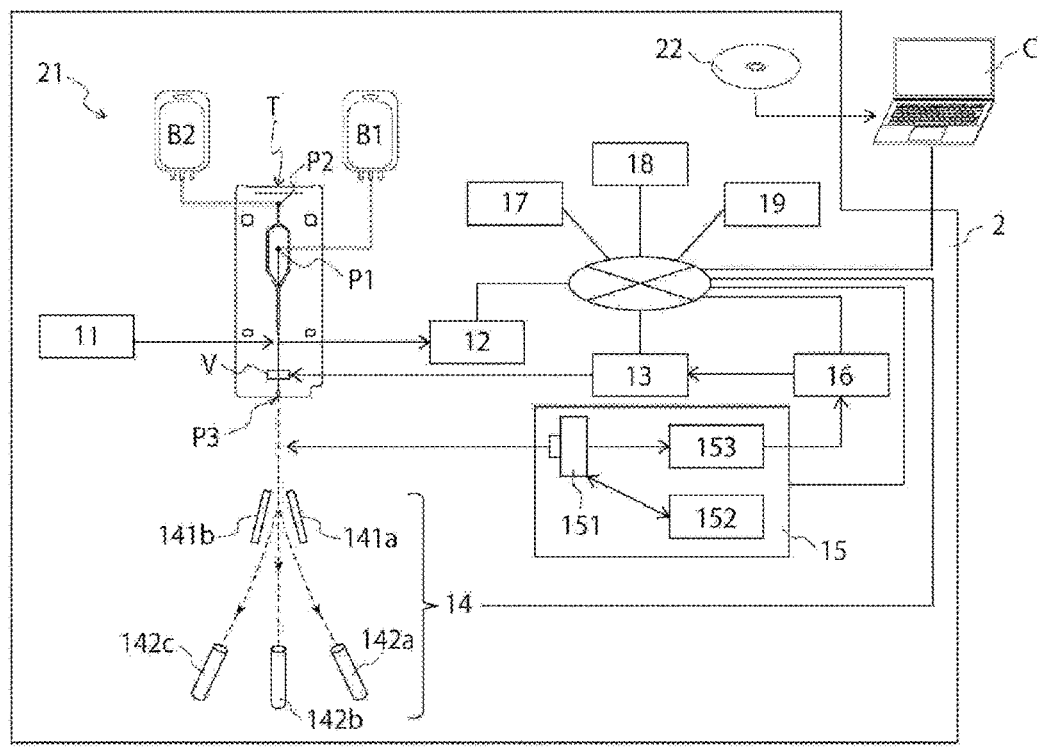
FIG. 9 is a schematic conceptual diagram schematically illustrating a first embodiment of a microparticle sorting system 2 according to the present technology.
Figure 10:
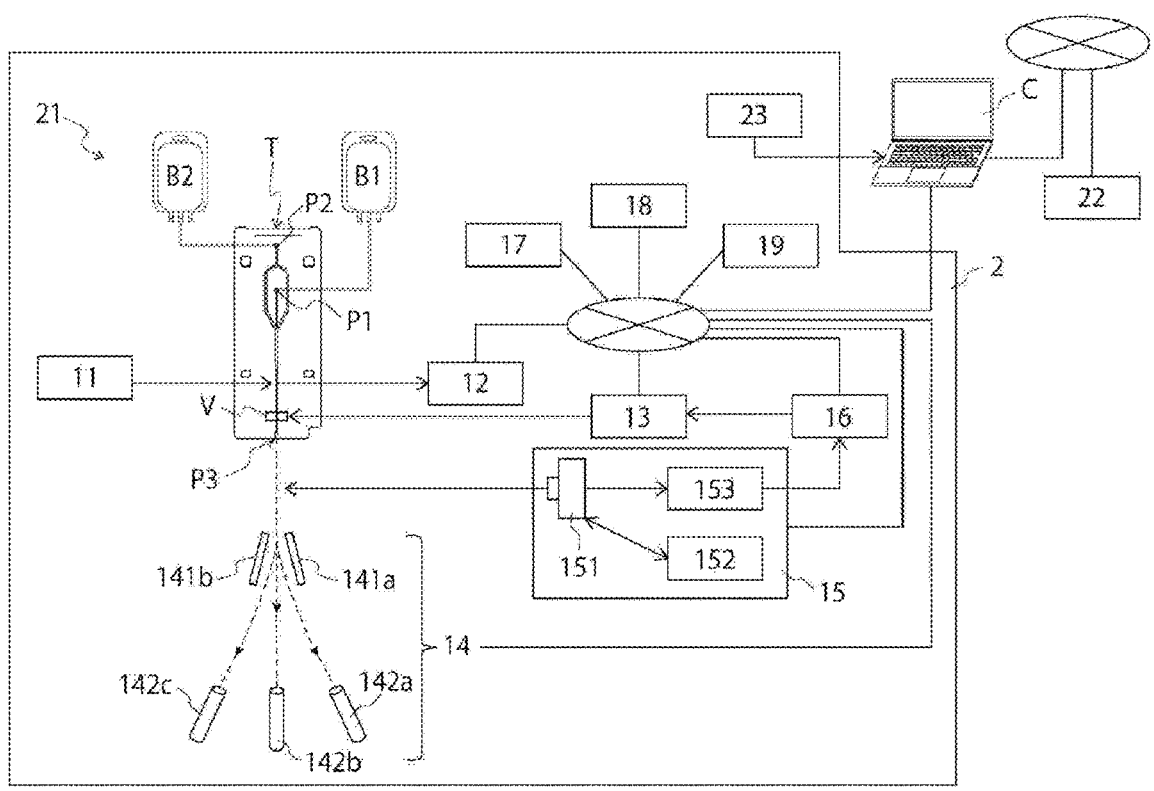
FIG. 10 is a schematic conceptual diagram schematically illustrating a second embodiment of a microparticle sorting system 2 according to the present technology.

FIG. 9 is a schematic conceptual diagram schematically illustrating a first embodiment of a microparticle sorting system 2 according to the present technology, and FIG. 10 is a schematic conceptual diagram schematically illustrating a second embodiment of the microparticle sorting system 2 according to the present technology. The microparticle sorting system 2 according to the first embodiment includes a microparticle sorting device 21 provided with a voltage supply unit 13 and a sorting unit 14, and a droplet control program 22.

The droplet control program 22 of the microparticle sorting system 2 according to the present technology is the program that allows the microparticle sorting device 21 to execute a function similar to the control function performed by the control unit 16 of the microparticle sorting device 1 described above, provided in a state of being stored in a recording medium such as a magnetic disk, an optical disk, a magneto-optical disk, or a flash memory, for example, and is downloaded to an electronic computer C and the like to be used.

Alternatively, the droplet control program 22 externally distributed via a network such as the Internet may be downloaded to the electronic computer C and the like to be used. In this case, the microparticle sorting system 2 may be provided in a state in which the microparticle sorting device 21 and a code 23 of acquiring the droplet control program 21 are packaged as in the second embodiment illustrated in FIG. 10.

The electronic computer C to which the droplet control program 22 is downloaded acquires a relative relationship between a droplet D discharged from an orifice P3 and a satellite droplet SD present between the droplets D, a control algorithm of the downloaded droplet control program 22 is executed, and a driving condition supplied to a vibration element V is calculated. The electronic computer C issues an instruction to the microparticle sorting device 21 on the basis of the calculated driving condition, so that the driving condition of the drive voltage supplied from the voltage supply unit 13 of the microparticle sorting device 21 to the vibration element V is automatically controlled.

Note that, the microparticle sorting system 2 may also be provided with a flow path P, a light irradiation unit 11, a light detection unit 12, a vibration element V, a droplet detection unit 15, an analysis unit 17, a storage unit 18, a display unit 19 and the like as necessary. They may be provided in the microparticle sorting device 21, or may be arranged independently. For example, although the microparticle sorting device 21 may be provided with the flow path P in advance, it is also possible to install a commercially available flow path P, a disposable tip provided with the flow path P and the like in the microparticle sorting device 21 to analyze or sort.

Furthermore, although the light irradiation unit 11 and the light detection unit 12 may be provided on the microparticle sorting device 21 in advance, it is also possible to irradiate microparticles flowing through the flow path P with light or detect light from the microparticles by using external light irradiation device, light detection device and the like. Moreover, the droplet detection unit 15, the analysis unit 17, the storage unit 18, the display unit 19 and the like may be provided in the microparticle sorting device 21 in advance, but external detection device, analysis device, storage device, display device and the like may also be used. In this case, each device may be connected to each other via a network.

Note that, since the details of each unit are the same as the details of each unit of the microparticle sorting device 1 according to the present technology described above, the description thereof is herein omitted.

<3. Droplet Sorting Device>

A droplet sorting device according to the present technology is at least provided with a voltage supply unit and a sorting unit that sorts a droplet. That is, the above-described microparticle sorting device 1 may also be used as the droplet sorting device that sorts the droplet not containing microparticles.

Note that, the droplet sorting device according to the present technology may also be provided with a flow path, a light irradiation unit, a light detection unit, a vibration element, a droplet detection unit, an analysis unit, a control unit, a storage unit, a display unit and the like as necessary. Since the details of each unit are the same as the details of each unit of the microparticle sorting device 1 according to the present technology described above, the description thereof is herein omitted.

<4. Droplet Control Device>

A droplet control device according to the present technology is at least provided with a control unit similar to the control unit 16 of the microparticle sorting device 1 described above; that is, the control unit 16 of the microparticle sorting device 1 described above may also be used independently as a droplet control device.

Note that, since the details of the control unit of the droplet control device is the same as that of the control unit 16 of the microparticle sorting device 1 described above, the description thereof is herein omitted.

<5. Droplet Control Program>

A droplet control program according to the present technology is the program that allows the microparticle sorting device 21 to execute a function similar to the control function performed by the control unit 16 of the microparticle sorting device 1 described above. That is, the droplet control program 22 of the microparticle sorting system 2 described above may also be independently distributed as the droplet control program.

Note that, since the details of the control function are the same as the control function performed by the control unit 16 of the microparticle sorting device 1 described above, the description thereof is herein omitted.

Note that, the present technology may also have the following configuration.

(1)

A microparticle sorting device provided with:
a voltage supply unit that supplies a drive voltage to a vibration element that applies a vibration to an orifice that generates a fluid stream;
a control unit that controls a driving condition supplied to the vibration element on the basis of a relative relationship between a droplet discharged from the orifice and a satellite droplet present between droplets; and
a sorting unit that sorts the droplet containing microparticles on the basis of optical information detected from the microparticles flowing through a flow path.

(2)

The microparticle sorting device according to (1), in which the control unit controls the driving condition using absorption easiness indicating absorption easiness of the satellite droplet by either preceding or subsequent droplet as an index.

(3)

The microparticle sorting device according to (2), in which the absorption easiness is calculated on the basis of a positional relationship between the satellite droplet and the preceding and subsequent droplets.

(4)

The microparticle sorting device according to (2) or (3), in which the absorption easiness is calculated on the basis of a time from a break-off point of the fluid stream until the satellite droplet is absorbed by either the preceding or subsequent droplet.

(5)

The microparticle sorting device according to any one of (2) to (4), in which the absorption easiness is calculated on the basis of a distance from a break-off point of the fluid stream until the satellite droplet is absorbed by either the preceding or subsequent droplet.

(6)

The microparticle sorting device according to any one of (1) to (5), in which the driving condition is a frequency of the drive voltage.

(7)

The microparticle sorting device according to (6), in which the driving condition is strength of the drive voltage.

(8)

The microparticle sorting device according to any one of (1) to (7), in which the control unit controls the driving condition on the basis of a positional relationship between the orifice and a break-off point of the fluid stream.

(9)

A microparticle sorting system provided with:
a microparticle sorting device provided with
a voltage supply unit that supplies a drive voltage to a vibration element that applies a vibration to an orifice that generates a fluid stream, and
a sorting unit that sorts a droplet containing microparticles on the basis of optical information detected from the microparticles flowing through a flow path; and
a droplet control program that allows a droplet sorting device to execute a control function of controlling a driving condition supplied to the vibration element that applies the vibration to the orifice on the basis of a relative relationship between the droplet discharged from the orifice that generates the fluid stream and a satellite droplet present between droplets.

(10)

A microparticle sorting system provided with:
a microparticle sorting device provided with
a voltage supply unit that supplies a drive voltage to a vibration element that applies a vibration to an orifice that generates a fluid stream, and
a sorting unit that sorts a droplet containing microparticles on the basis of optical information detected from the microparticles flowing through a flow path; and
a code of acquiring a droplet control program that allows a droplet sorting device to execute a control function of controlling a driving condition supplied to the vibration element that applies the vibration to the orifice on the basis of a relative relationship between the droplet discharged from the orifice that generates the fluid stream and a satellite droplet present between droplets.

(11)

A droplet sorting device provided with:
a voltage supply unit that supplies a drive voltage to a vibration element that applies a vibration to an orifice that generates a fluid stream; and
a sorting unit that sorts a droplet by controlling a driving condition supplied to the vibration element on the basis of a relative relationship between the droplet discharged from the orifice and a satellite droplet present between droplets.

(12)

A droplet control device provided with: a control unit that controls a driving condition supplied to a vibration element that applies a vibration to an orifice on the basis of a relative relationship between a droplet discharged from the orifice that generates a fluid stream and a satellite droplet present between droplets.

(13)

A droplet control program, that allows a droplet sorting device to execute a control function of controlling a driving condition supplied to a vibration element that applies a vibration to an orifice on the basis of a relative relationship between a droplet discharged from the orifice that generates a fluid stream and a satellite droplet present between droplets.

Note that, the effect described in this specification is illustrative only; the effect is not limited thereto and there may also be another effect.

REFERENCE SIGNS LIST

1 Microparticle sorting device
P Flow path
P1 Sample inlet
P2 Sheath inlet
P3 Orifice
11 Light irradiation unit
12 Light detection unit
V Vibration element
13 Voltage supply unit
14 Sorting unit
141a, 141b Deflection plate
142a to 142c Recovery container
15 Droplet detection unit
151 Imaging element
152 Position adjustment mechanism
153 Image data processing unit
BP Break-off point
16 Control unit
D Droplet
SD Satellite droplet
17 Analysis unit
18 Storage unit
19 Display unit
2 Microparticle sorting system
22 Droplet control program
23 Code

The invention claimed is:

1. A microparticle sorting device comprising:
a voltage supply unit that supplies a drive voltage to a vibration element to generate a droplet from a fluid stream;
control circuitry configured to control a driving condition supplied to the vibration element on a basis of a relative relationship between the droplet and a satellite droplet present between droplets, the control including calculating an absorption easiness indicating an easiness with which the satellite droplet is absorbed by either a preceding droplet or a subsequent droplet and controlling the driving condition based on the calculated absorption easiness; and
a sorting unit that sorts a droplet containing microparticles on a basis of optical information detected from the microparticles flowing through a flow path, wherein the absorption easiness is calculated on a basis of a distance from a break-off point where the fluid is converted into the fluid droplet to a point where the satellite droplet is absorbed by either the preceding droplet or the subsequent droplet.

2. The microparticle sorting device according to claim 1, wherein the driving condition is a frequency of the drive voltage.

3. The microparticle sorting device according to claim 2, wherein the driving condition is a strength of the drive voltage.

4. The microparticle sorting device according to claim 1, wherein the control circuitry is configured to control the driving condition on a basis of a positional relationship between an orifice and the break-off point of the fluid stream.

5. The microparticle sorting device according to claim 1, wherein the control includes calculating the absorption easiness for a plurality of different frequencies of the drive voltage and selecting a frequency of the drive voltage for which the calculated absorption easiness has a highest value.

6. A microparticle sorting system comprising:
a microparticle sorting device provided with
a voltage supply unit that supplies a drive voltage to a vibration element to generate a droplet from a fluid stream, and
a sorting unit that sorts a droplet containing microparticles on a basis of optical information detected from the microparticles flowing through a flow path; and
control circuitry configured to control a driving condition supplied to the vibration element on a basis of a relative relationship between the droplet and a satellite droplet present between droplets, the control including calculating an absorption easiness indicating an easiness with which the satellite droplet is absorbed by either a preceding droplet or a subsequent droplet and controlling the driving condition based on the calculated absorption easiness, wherein the absorption easiness is calculated on a basis of a distance from a break-off point where the fluid is converted into the fluid droplet to a point where the satellite droplet is absorbed by either the preceding droplet or the subsequent droplet.

7. A microparticle sorting method executed by a microparticle sorting device, the method comprising:
supplying a drive voltage to a vibration element to generate a droplet from a fluid stream;
sorting a droplet containing microparticles on a basis of optical information detected from the microparticles flowing through a flow path; and
controlling a driving condition supplied to the vibration element on a basis of a relative relationship between the droplet and a satellite droplet present between droplets, the controlling including calculating an absorption easiness indicating an easiness with which the satellite droplet is absorbed by either a preceding droplet or a subsequent droplet and controlling the driving condition based on the calculated absorption easiness, wherein the absorption easiness is calculated on a basis of a distance from a break-off point where the fluid is converted into the fluid droplet to a point where the satellite droplet is absorbed by either the preceding droplet or the subsequent droplet.

8. A droplet sorting device comprising:
a voltage supply unit that supplies a drive voltage to a vibration element to generate a droplet from a fluid stream; and
a sorting unit that sorts a droplet by controlling a driving condition supplied to the vibration element by control circuitry on a basis of a relative relationship between the droplet and a satellite droplet present between droplets, the controlling including calculating an absorption easiness indicating an easiness with which the satellite droplet is absorbed by either a preceding droplet or a subsequent droplet and controlling the driving condition based on the calculated absorption easiness, wherein the absorption easiness is calculated on a basis of a distance from a break-off point where the fluid is converted into the fluid droplet to a point where the satellite droplet is absorbed by either the preceding droplet or the subsequent droplet.

9. A droplet control device comprising: control circuitry configured to control a driving condition supplied to a vibration element that generates a droplet from a fluid stream on a basis of a relative relationship between the droplet and a satellite droplet present between droplets, the control including calculating an absorption easiness indicating an easiness with which the satellite droplet is absorbed by either a preceding droplet or a subsequent droplet and controlling the driving condition based on the calculated absorption easiness, wherein the absorption easiness is calculated on a basis of a distance from a break-off point where the fluid is converted into the fluid droplet to a point where the satellite droplet is absorbed by either the preceding droplet or the subsequent droplet.

10. A non-transitory computer readable medium storing instructions that, when executed by control circuitry, cause a droplet sorting device to control a driving condition supplied to a vibration element that generates a droplet from a fluid stream on a basis of a relative relationship between the droplet and a satellite droplet present between droplets, the control including calculating an absorption easiness indicating an easiness with which the satellite droplet is absorbed by either a preceding droplet or a subsequent droplet and controlling the driving condition based on the calculated absorption easiness, wherein the absorption easiness is calculated on a basis of a distance from a break-off point where the fluid is converted into the fluid droplet to a point where the satellite droplet is absorbed by either the preceding droplet or the subsequent droplet.

11. A microparticle sorting device comprising:
a voltage supply unit that supplies a drive voltage to a vibration element to generate a droplet from a fluid stream;
control circuitry configured to control a driving condition supplied to the vibration element on a basis of a distance from a break-off point where the fluid stream in converted into the droplet to a point where a satellite droplet present between droplets is absorbed by either a preceding droplet or a subsequent droplet; and
a sorting unit that sorts a droplet containing microparticles on a basis of optical information detected from the microparticles flowing through a flow path.

* * * * *